United States Patent
Born et al.

(10) Patent No.: US 11,936,016 B2
(45) Date of Patent: Mar. 19, 2024

(54) BATTERY CELL COMPRISING A TEMPERATURE SENSOR

(71) Applicant: Bayerische Motoren Werke Aktiengesellschaft, Munich (DE)

(72) Inventors: Christoph Born, Munich (DE); Christian Kulp, Munich (DE); Arne Menck, Munich (DE); Sebastian Paul, Munich (DE); Jan Philipp Schmidt, Munich (DE); Benno Schweiger, Munich (DE); Werner Seliger, Hallbergmoos (DE); Jens Vetter, Hebertshausen (DE); Hermann Zehentner, Hohenpolding (DE); Dieter Ziegltrum, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 409 days.

(21) Appl. No.: 16/264,834

(22) Filed: Feb. 1, 2019

(65) Prior Publication Data
US 2019/0165434 A1 May 30, 2019

Related U.S. Application Data

(63) Continuation of application No. PCT/EP2017/076038, filed on Oct. 12, 2017.

(30) Foreign Application Priority Data

Oct. 12, 2016 (DE) .................. 10 2016 219 840

(51) Int. Cl.
*H01M 10/48* (2006.01)
*B60L 3/00* (2019.01)
(Continued)

(52) U.S. Cl.
CPC ............ *H01M 10/486* (2013.01); *B60L 3/00* (2013.01); *B60L 50/64* (2019.02); *B60L 58/10* (2019.02);
(Continued)

(58) Field of Classification Search
CPC . H01M 10/486; H01M 2220/20; B60L 50/64; B60L 58/10; B60L 3/00;
(Continued)

(56) References Cited

U.S. PATENT DOCUMENTS

| 2004/0161664 A1 | 8/2004 | Hanafusa et al. |
| 2011/0039137 A1 | 2/2011 | Engle et al. |
| 2013/0004811 A1* | 1/2013 | Banerjee ............ H01M 10/637 429/62 |

FOREIGN PATENT DOCUMENTS

| CN | 102576915 A | 7/2012 |
| CN | 103180701 A | 6/2013 |

(Continued)

OTHER PUBLICATIONS

DE112010003272T5_-_ Battery_cell_with_integrated_sensor_platform_-_ Google_Patent.pdf (Year: 2013).*
(Continued)

*Primary Examiner* — Brian R Ohara
*Assistant Examiner* — Patrick Marshall Greene
(74) *Attorney, Agent, or Firm* — Crowell & Moring LLP

(57) ABSTRACT

Disclosed is a battery cell including an electrode, a housing, a cell interior inside the housing, a temperature sensor, and a heat-conducting part which differs from the electrode, is entirely or partially disposed inside the housing of the battery cell, and is thermally connected to the temperature sensor.

6 Claims, 2 Drawing Sheets

(51) Int. Cl.
*B60L 50/64* (2019.01)
*B60L 58/10* (2019.01)
*G01K 1/00* (2006.01)
*G01K 1/16* (2006.01)
*G01K 13/00* (2021.01)

(52) U.S. Cl.
CPC .............. *G01K 1/16* (2013.01); *G01K 13/00* (2013.01); *B60L 2240/36* (2013.01); *B60L 2240/545* (2013.01); *G01K 1/00* (2013.01); *G01K 2205/00* (2013.01); *H01M 2220/20* (2013.01); *Y02T 10/70* (2013.01)

(58) Field of Classification Search
CPC . B60L 2240/36; B60L 2240/545; G01K 1/16; G01K 13/00; G01K 1/00; G01K 2205/00; Y02T 10/7005; Y02T 10/705
See application file for complete search history.

(56) References Cited

FOREIGN PATENT DOCUMENTS

| | | | |
|---|---|---|---|
| CN | 104347907 A | 2/2015 | |
| CN | 205104584 U | 3/2016 | |
| DE | 101 54 920 A1 | 5/2003 | |
| DE | 11 2010 003272 T5 * | 1/2013 | ............ H01M 10/48 |
| DE | 20 2012 012 655 U1 | 1/2014 | |
| DE | 102013015700 A1 * | 3/2015 | ............ H01M 10/48 |
| JP | 2-94263 A | 4/1990 | |
| JP | 5-61956 U | 8/1993 | |
| JP | 2006-250734 A | 9/2006 | |
| JP | 2006250734 A * | 9/2006 | |
| JP | 2008-258089 A | 10/2008 | |
| WO | WO 2011/019458 A1 | 2/2011 | |
| WO | WO 2012/072163 A1 | 6/2012 | |

OTHER PUBLICATIONS

International Search Report (PCT/ISA/210) issued in PCT Application No. PCT/EP2017/076038 dated Nov. 16, 2017 with English translation (six (6) pages).

German-language Written Opinion (PCT/ISA/237) issued in PCT Application No. PCT/EP2017/076038 dated Nov. 16, 2017 (five (5) pages).

German-language Search Report issued in counterpart German Application No. 102016219840.8 dated Jun. 20, 2017 with partial English translation (10 pages).

Chinese language Office Action issued in Chinese Application No. 201780045295.6 dated Apr. 30, 2021 with English translation (18 pages).

Chinese-language Office Action issued in Chinese Application No. 201780045295.6 dated Nov. 9, 2022 with English translation (14 pages).

* cited by examiner

BATTERY CELL COMPRISING A TEMPERATURE SENSOR

CROSS REFERENCE TO RELATED APPLICATIONS

This application is a continuation of PCT International Application No. PCT/EP2017/076038, filed Oct. 12, 2017, which claims priority under 35 U.S.C. § 119 from German Patent Application No. 10 2016 219 840.8, filed Oct. 12, 2016, the entire disclosures of which are herein expressly incorporated by reference.

BACKGROUND AND SUMMARY OF THE INVENTION

The present invention relates to a battery cell, a high-voltage battery, and an electric vehicle or a hybrid vehicle.

Battery cells of a high-voltage battery for a motor vehicle, or for an electric or hybrid vehicle, are preferably structured on the basis of lithium-ion cells. A high-voltage on-board network in an electric vehicle or a hybrid vehicle is customarily understood as an on-board network having a service voltage of, e.g., 60-400 volts during operation. A high-voltage battery customarily operates at optimum efficiency in a temperature range of the order of approximately 15° C.-40° C. Firstly, the battery cells might sustain damage, if the battery cell temperature is excessively high. Secondly, as electrochemical cells, the battery cells show a lower capacity and a reduced power output capability at lower temperatures than at the optimum service temperature. For this reason, a temperature sensor is normally arranged on a battery cell, in order to measure the temperature of the cell interior of the battery cell. The measured temperature information is transmitted via a signal line to a control unit which is located in the high-voltage battery. The control unit of the high-voltage battery then determines whether the current temperature of the battery cell lies within a stipulated temperature range.

FIG. 1 shows a known battery cell from the prior art, having a temperature sensor. The battery cell 1 comprises a housing 7 and a cell interior 6, which is located inside the housing 7. The temperature sensor 4, which incorporates a signal line 5, is arranged on an electrical connection 2, or terminal, of the battery cell 1, in order to measure the temperature of the cell interior 6 of the battery cells which is located inside the housing 7. The temperature sensor 4 is normally welded to the electrical terminal 2 or to the housing 7 of the battery cell 1.

As mentioned above, it is important to measure the temperature of the cell interior of the battery cell. However, there is a significant clearance between the site of installation of the temperature sensor 4 and the cell interior 6, the temperature of which is to be measured. As the housing 7, or the gas contained in the housing 7, can impair thermal conduction between the cell interior 6 and the temperature sensor 4, the current temperature of the cell interior 6 cannot be measured either rapidly or accurately by the temperature sensor 4.

The object of the present invention is to provide a cost-effective battery cell, which permits a more accurate measurement of the current temperature of the battery cell, specifically of the cell interior of the battery cell, and the disclosure of a high-voltage battery having at least one such battery cell, and of an electric or hybrid vehicle having such a high-voltage battery.

This object is fulfilled by the characteristics of the independent claims of this application.

Advantageous configurations and further developments of the invention are identified in the dependent claims, wherein mutual combinations of the individual characteristics claimed are also possible.

DISCLOSURE OF THE INVENTION

The battery cell according to the invention comprises an electrode, a housing, a cell interior which is located inside the housing, and a temperature sensor. The battery cell comprises a thermally conductive part, wherein the thermally conductive part is separate from the electrode, is entirely or partially arranged in the housing of the battery cell, and is thermally connected to the temperature sensor.

According to the invention, the thermally conductive part, which can be constituted of a thermally conductive material, is entirely or partially arranged in the housing of the battery cell. Consequently, the thermally conductive part assumes an equal, or a very similar temperature to the cell interior of the battery cell. On the grounds of the thermal connection between the temperature sensor and the thermally conductive part, the current temperature of the cell interior can be rapidly and accurately detected by the temperature sensor.

As currents flow in the electrode of the battery cell, the currents can strongly influence the temperature of the electrode. The electrode is therefore not suitable for use as a thermally conductive part, and is thus not employed as a thermally conductive part. The thermally conductive part is therefore separate from the electrode.

A good thermally conductive material can be, for example, a metal (aluminum, copper, steel, etc.), or a thermally conductive pad or thermally conductive paste comprised, for example, of silicone-rubber films. Moreover, the use of heat pipes as outstanding thermal conductors is possible. The thermal conductivity of the abovementioned thermally conductive part exceeds a value of 3.5 W/(m·K).

In comparison with the prior art represented in FIG. 1, thermal conduction between the cell interior and the temperature sensor according to the invention is optimized, as the thermally conductive part constitutes a thermally conductive bridge between the cell interior and the temperature sensor. Consequently, the current temperature, and the temperature variation in the cell interior, can be detected as rapidly as possible.

According to a further development of the invention, the temperature sensor is arranged outside the housing.

According to a further development of the invention, the temperature sensor is arranged on the housing.

According to a further development of the invention, the thermally conductive part is in direct thermal contact with the temperature sensor.

According to a further development of the invention, the thermally conductive part is in direct thermal contact with the cell interior.

Consequently, the thermally conductive part can constitute a thermal connection between the cell interior and the temperature sensor.

According to a further development of the invention, the thermally conductive part is arranged on an inner wall of the housing.

According to a further development of the invention, the thermally conductive part is arranged on the cell interior.

According to a further development of the invention, the thermally conductive part is constituted of a thermally conductive material.

According to a further development of the invention, the thermally conductive part is constituted of an electrically insulating material.

The thermally conductive part, e.g., an electrically insulating, thermally conductive pad, connects the temperature sensor to the cell interior, such that the temperature of the cell interior can be detected by the temperature sensor as rapidly as possible, in the absence of, or with only very limited external interference (e.g., cooling associated with the circulation of air in the free air space of the cell). It is advantageous if this electrically insulating, but good thermally conductive material features a degree of flexibility or elasticity, as the fitting of the thermally conductive part in the housing of the battery cell can be simplified accordingly, and manufacturing tolerances can be compensated.

The present invention further proposes a high-voltage battery having at least one abovementioned battery cell.

The present invention further proposes an electric vehicle or a hybrid vehicle having at least one abovementioned high-voltage battery.

According to the invention, the thermally conductive part constitutes a thermally conductive bridge between the temperature sensor and the cell interior. The thermally conductive part lies in direct thermal contact with the cell interior of the battery cell. As thermal conduction between the cell interior and the temperature sensor is optimized, and external interference is reduced, the current temperature of the cell interior can be accurately and rapidly detected. Consequently, the accuracy and rapidity or promptness of temperature measurement can be improved, without the employment of additional measuring devices, or any reservations incorporated in monitoring or plausibility models can be reduced.

The invention is described in greater detail hereinafter, with reference to the drawings. In the drawings:

Other objects, advantages and novel features of the present invention will become apparent from the following detailed description of one or more preferred embodiments when considered in conjunction with the accompanying drawings.

Figure 1:
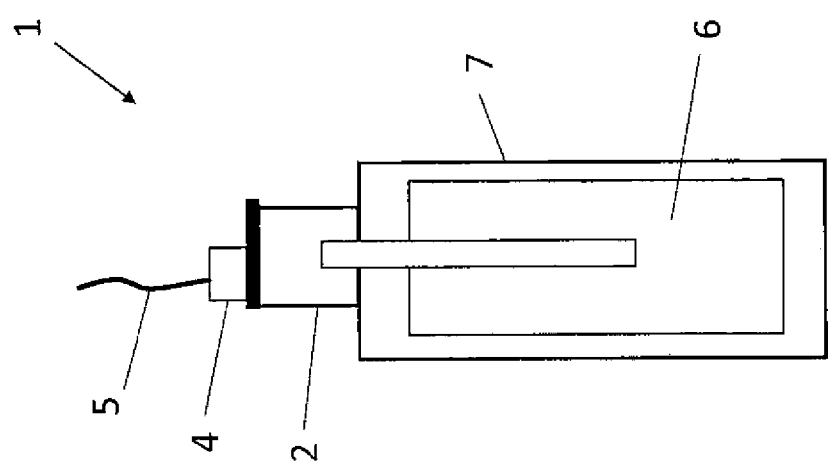
FIG. 1 shows a known battery cell from the prior art, having a temperature sensor.
Figure 2:
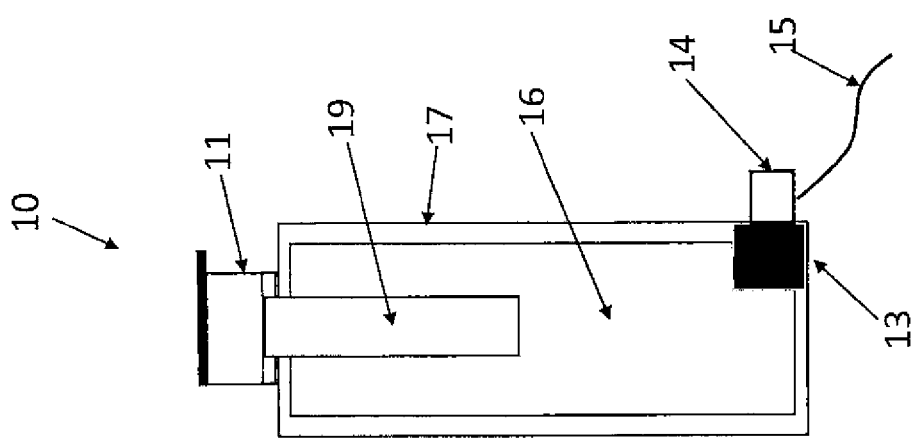
FIG. 2 shows a battery cell having a temperature sensor according to an exemplary embodiment of the invention.

The exemplary embodiment described hereinafter with reference to FIG. 2 constitutes a preferred form of embodiment of the present invention.

DETAILED DESCRIPTION OF THE DRAWINGS

The battery cell 10 comprises two electrical terminals, of which only the electrical terminal 11 is visible here, a housing 17 and a cell interior 16 located inside the housing 17. Chemical reactions occur in the cell interior. Chemical energy is converted into electrical energy as a result. The battery cell 10 comprises an electrode 19. The electrode 19 extends from the cell interior 16 to the electrical terminal 11, and thus electrically connects the cell interior 16 to the electrical terminal 12. In the housing 17, a filler gas is provided between the housing 17 and the cell interior 16. As mentioned above, the filler gas in the housing 17, and the housing 17, can impair thermal conduction between the cell interior 16 and the temperature sensor 4.

The battery cell 10 further comprises a thermally conductive part 13. The thermally conductive part 13 is at least partially arranged in the housing 17 of the battery cell 10. Preferably, the thermally conductive part 13 can be arranged entirely within the housing 17. The thermally conductive part 13, which can be constituted of a thermally conductive material, is moreover thermally connected to the temperature sensor. Preferably, the thermally conductive part 13 lies in direct thermal contact or in direct contact with the cell interior 16. The thermally conductive part 13 can be arranged on an inner wall of the housing 17 and/or on the cell interior 16. The thermally conductive part 13 extends from the housing 17 to the cell interior 16. The thermally conductive part 13 is preferably constituted of a good thermally conductive material, e.g., of an electrically insulating, thermally conductive pad. Accordingly, the thermally conductive part 13 can assume an equal temperature to the cell interior 16 of the battery cell 10.

As currents flow in the electrode 19 of the battery cell 10, the currents can strongly influence the temperature of the electrode 19. This can result in an inaccurate temperature measurement of the cell interior. Consequently, the electrode 19 of the battery cell 10 is not suitable for use as a thermally conductive part. The thermally conductive part is therefore separate from the electrode. Moreover, the temperature sensor should not lie in direct contact with the electrode 19, in order to prevent any unwanted influence associated with the current flowing in the electrode 19.

It is advantageous if this electrically insulating, but good thermally conductive material features a degree of flexibility or elasticity, as the fitting of the thermally conductive part 13 in the housing 17 of the battery cell 10 can be simplified accordingly, and manufacturing tolerances can be compensated. Moreover, there is no resulting expansion of the volume of the battery cell according to the invention.

A good thermally conductive material can be, for example, a metal (aluminum, copper, steel, etc.), or a thermally conductive pad or thermally conductive paste comprised, for example, of silicone-rubber films. The thermal conductivity (symbol: $\lambda$) of the abovementioned thermally conductive part exceeds a value of 3.5 W/(m·K).

As a result of the direct thermal connection between the temperature sensor 14 and the thermally conductive part 13, the current temperature of the cell interior can be promptly and accurately detected by the temperature sensor.

A temperature sensor 14 comprises a signal line 15. The measured temperature information can be transmitted via the signal line 15 to the control unit of the high-voltage battery (not represented). The control unit of the high-voltage battery can thus determine whether the current temperature of the battery cell lies within a stipulated temperature range. The more accurately and more rapidly the current temperature can be detected, the more effectively the control of the battery cell can be optimized vis-à-vis the current temperature of the battery cell 10, thus permitting the achievement of advantages with respect to the capacity and service life of the battery cells.

The electrical terminal 11 of the battery cell 10 is configured as a solid body of metal, e.g., copper. The temperature sensor 14 is arranged, e.g., by the welding thereof to the housing 17. The battery cell 10 can comprise a further electrical terminal (not represented).

The thermally conductive part 13 can be arranged at any appropriate location, e.g., on the top side or underside, or on the side wall of the housing 17. As represented in FIG. 2, the thermally conductive part 13 can be arranged on a side which is averted from the electrical terminal 11, i.e., on the underside of the housing 17 represented in FIG. 2. The temperature sensor 14 can preferably be connected to the thermally conductive part 13 by means of the housing 17, the wall of which is customarily constituted of a metal, e.g., aluminum. Preferably, however, it is not absolutely necessary for the temperature sensor 14 and the thermally conductive part 13 to be arranged at the same position on the wall of the housing 17, wherein the temperature sensor 14 is arranged outside the housing 17, e.g., by welding, and the thermally conductive part 13 is arranged inside the housing 17, e.g., by adhesive bonding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery cell comprising:
   an electrode;
   a housing;
   a cell interior which is located inside the housing;
   a temperature sensor mounted entirely outside of the housing on an exterior wall of the housing; and
   a thermally conductive part that is arranged separately from the electrode, is entirely arranged in the housing of the battery cell, is arranged on an inner wall of the housing directly across from the temperature sensor, and is thermally connected to the temperature sensor;
   wherein the thermally conductive part is in direct thermal contact with the cell interior; and
   wherein the thermally conductive part is formed from an electrically insulating material.

2. The battery cell as claimed in claim 1, wherein the thermally conductive part is in direct thermal contact with the temperature sensor.

3. The battery cell as claimed in claim 1, wherein the thermally conductive part is arranged in the cell interior.

4. The battery cell as claimed in claim 1, wherein the thermally conductive part comprises a thermally conductive material.

5. A high-voltage battery comprising:
   at least one battery cell including:
      an electrode;
      a housing;
      a cell interior which is located inside the housing;
      a temperature sensor mounted entirely outside of the housing on an exterior wall of the housing; and
   a thermally conductive part that is arranged separately from the electrode, is entirely arranged in the housing of the battery cell, is arranged on an inner wall of the housing directly across from the temperature sensor, and is thermally connected to the temperature sensor;
   wherein the thermally conductive part is in direct thermal contact with the cell interior; and
   wherein the thermally conductive part is formed from an electrically insulating material.

6. An electric vehicle or hybrid vehicle comprising:
   at least one high-voltage battery including:
      at least one battery cell including:
         an electrode;
         a housing;
         a cell interior which is located inside the housing;
         a temperature sensor mounted entirely outside of the housing on an exterior wall of the housing; and
   a thermally conductive part that is arranged separately from the electrode, is entirely arranged in the housing of the battery cell, is arranged on an inner wall of the housing directly across from the temperature sensor, and is thermally connected to the temperature sensor;
   wherein the thermally conductive part is in direct thermal contact with the cell interior; and
   wherein the thermally conductive part is formed from an electrically insulating material.

* * * * *